(12) United States Patent
Miya et al.

(10) Patent No.: US 6,914,932 B1
(45) Date of Patent: Jul. 5, 2005

(54) COMMUNICATION TERMINAL APPARATUS AND RADIO RECEPTION METHOD

(75) Inventors: Kazuyuki Miya, Kawasaki (JP); Satoshi Imaizumi, Yokosuka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 688 days.

(21) Appl. No.: 09/604,315

(22) Filed: Jun. 27, 2000

(30) Foreign Application Priority Data

Jul. 2, 1999 (JP) .......................................... 11-189093

(51) Int. Cl.[7] .............................................. H04B 1/10
(52) U.S. Cl. ................................................... 375/150
(58) Field of Search ................................. 375/140, 142, 375/141, 150, 346, 347, 130, 244, 343, 349, 144, 148; 370/342, 335, 441; 455/506, 65

(56) References Cited

U.S. PATENT DOCUMENTS

| | | | | |
|---|---|---|---|---|
| 6,094,449 A | | 7/2000 | Komatsu | 375/136 |
| 6,269,075 B1 | * | 7/2001 | Tran | 370/206 |
| 6,314,127 B1 | * | 11/2001 | Lynch | 375/144 |
| 6,333,934 B1 | * | 12/2001 | Miura | 370/441 |
| 6,282,229 B1 | * | 8/2002 | Aoyama | 375/130 |
| 6,430,166 B1 | * | 8/2002 | Bejjani et al. | 370/320 |

FOREIGN PATENT DOCUMENTS

JP        10313267        11/1998

OTHER PUBLICATIONS

European Search Report dated Aug. 18, 2003.

* cited by examiner

*Primary Examiner*—Mohammed Ghayour
*Assistant Examiner*—Dung X. Nguyen
(74) *Attorney, Agent, or Firm*—Stevens, Davis, Miller & Mosher, LLP

(57) ABSTRACT

Received level measurement circuit 1071 performs received level measurement using input despread traffic channel data. Received level measurement circuit 1072 performs received level measurement using input despread common control channel data. These received levels are respectively output from received level measurement circuits 1071 and 1072 to correlation circuit 1075. Correlation circuit 175 first performs correlation calculation between paths in respective profiles of the traffic channel and common control channel each generated based on respective received level. Based on the result of the correlation calculation, path selection is performed to determine a reception timing.

7 Claims, 9 Drawing Sheets

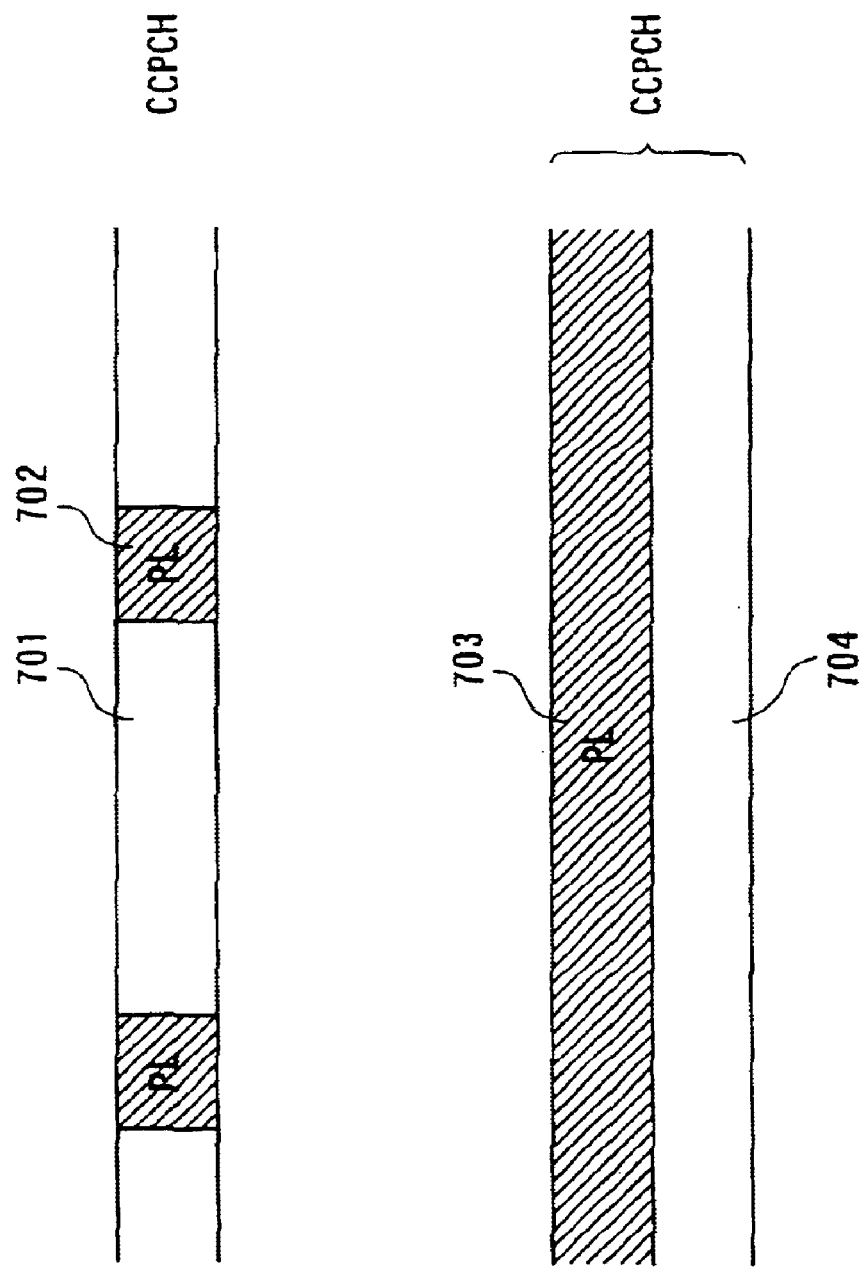

COMMUNICATION TERMINAL APPARATUS AND RADIO RECEPTION METHOD

BACKGROUND OF THE INVENTION

1. Field of the Invention

The present invention relates to a communication terminal apparatus and radio reception method in a digital radio communication system, and more particularly, to a communication terminal apparatus and radio reception method in a Direct Sequence-Code Division Multiple Access system in which forward transmission directional control is applied using a smart antenna and adaptive array antenna.

2. Description of the Related Art

Conventionally in the case where traffic channel signals and common control channel signals are transmitted with the same transmission method (both with omnidirectional), dedicated physical channel (traffic channel) signals are controlled with a very limit received level (Eb/NO or SIR) providing a required quality by transmit power control to improve the spectral efficiency.

On the contrary, with respect to the common control channel signals, in order to enable all communication terminals in a service area to receive surrounding cell information for a handover, in other words, to enable all the communication terminals in the service area to ensure received qualities higher than a predetermined level, the signals are generally transmitted to the terminals in the service area and around the service area with power higher than that of the traffic channel signals.

Accordingly in the above-mentioned case, in each of the communication terminals, a searcher, which selects a path of the traffic channel signals, in other words, which detects a timing for despreading processing, operates using as references the common control channel signals that have higher power levels than the traffic channel signals without using entire traffic channel signals, to perform the search with high reliability.

In a base station, the common control channel (for example, CCPCH: Common Control Physical CHannel) signals are usually transmitted with omnidirectional (omni or sector), and on the contrary, the traffic channel (DPCH: Dedicated Physical CHannel) signals are sometimes transmitted with directional control using a transmission radiation pattern. In this case, as illustrated in FIG. 1, the base station transmits the traffic channel signals to communication terminal 1 with the omnidirectional. Accordingly communication terminal 1 receives all signals passed through path 1 on which the signals directly arrive at communication terminal 1 from base station 2, and paths 2 and 3 respectively on which the signals are reflected by obstacles 3 and 4, and arrive at communication terminal 1. Therefore a delay profile is as illustrated in FIG. 1B.

On the contrary, in the case where transmission directional control is applied to the traffic channel signals, as illustrated in FIG. 2A, transmission is performed with a radiation pattern indicated with X. In this case, since propagation paths are limited, communication terminal 1 receives signals passed through path 1 on which the signals directly arrive at communication terminal 1 from base station 2, and path on which the signals are reflected by obstacle 4, and arrive at communication terminal 1 from base station 2, and does not receive the signals passed through path 2 on which the signals are reflected by obstacle 3, and arrive at communication terminal 1 from base station 2. Therefore the delay profile is as illustrated in FIG. 2B.

Thus, since the directional controlled traffic channel limits propagation paths thereof, propagation paths are different between the traffic channel and the common control channel, and thereby delay profiles become different. In this case, as can be seen from FIGS. 1B and 2B, path 2 that is not contained in the delay profile of the traffic cannel is present in the delay profile of the common control channel. Therefore there is a problem that the searcher selects a wrong path when operates using the common control channel signals as references as described above.

On the other hand, when the searcher operates using the traffic channel signals as references, since the signals are controlled with the very limit received level providing the required quality by the transmit power control, the reliability of path selection is decreased.

SUMMARY OF THE INVENTION

It is an object of the present invention to provide a communication terminal apparatus and radio reception method capable of performing path selection accurately with high reliability even in the case where a base station performs directional controlled transmission.

It is a subject of the present invention that in a DS-CDMA system in which forward transmission directional control is applied using, for example, a smart antenna and adaptive array antenna, a communication terminal performs correlation calculation between a delay profile of a dedicated physical channel and a delay profile of a common control channel, and thereby performs path selection (finger selection) accurately with high reliability.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which;

FIG. 9A is a diagram to explain a common control channel; and

FIG. 9B is another diagram to explain the common control channel.

DETAILED DESCRIPTION OF THE PREFERRED EMBODIMENTS

Embodiments of the present invention will be described specifically below with reference to accompanying drawings.

(First Embodiment)

Figures 1A, 1B:
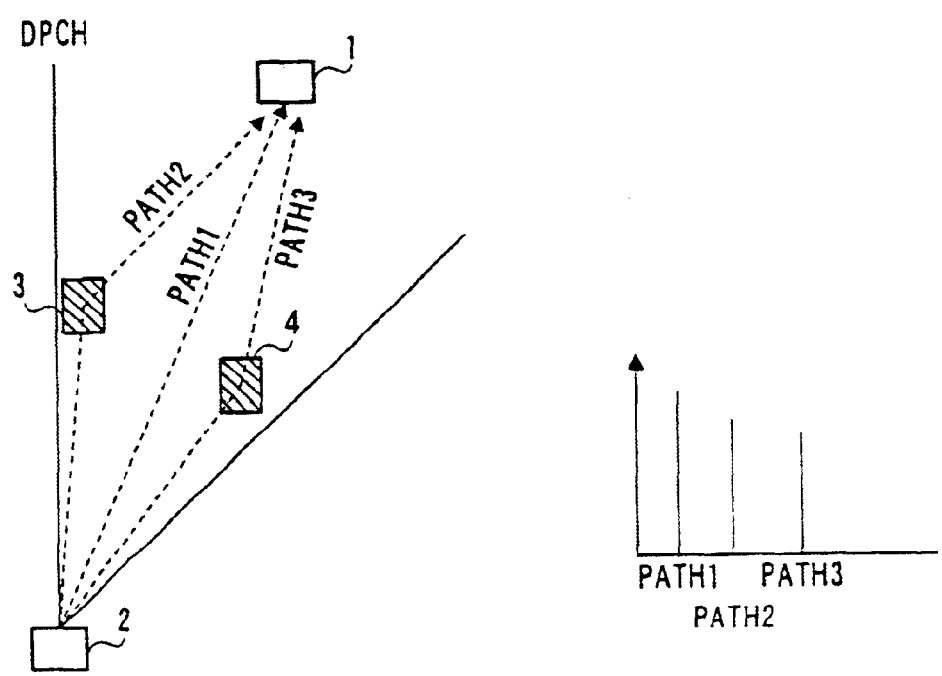
FIG. 1A is a diagram to explain omnidirectional transmission.
FIG. 1B is a diagram illustrating a delay profile in the case illustrated in FIG. 1A.
Figures 2A, 2B:
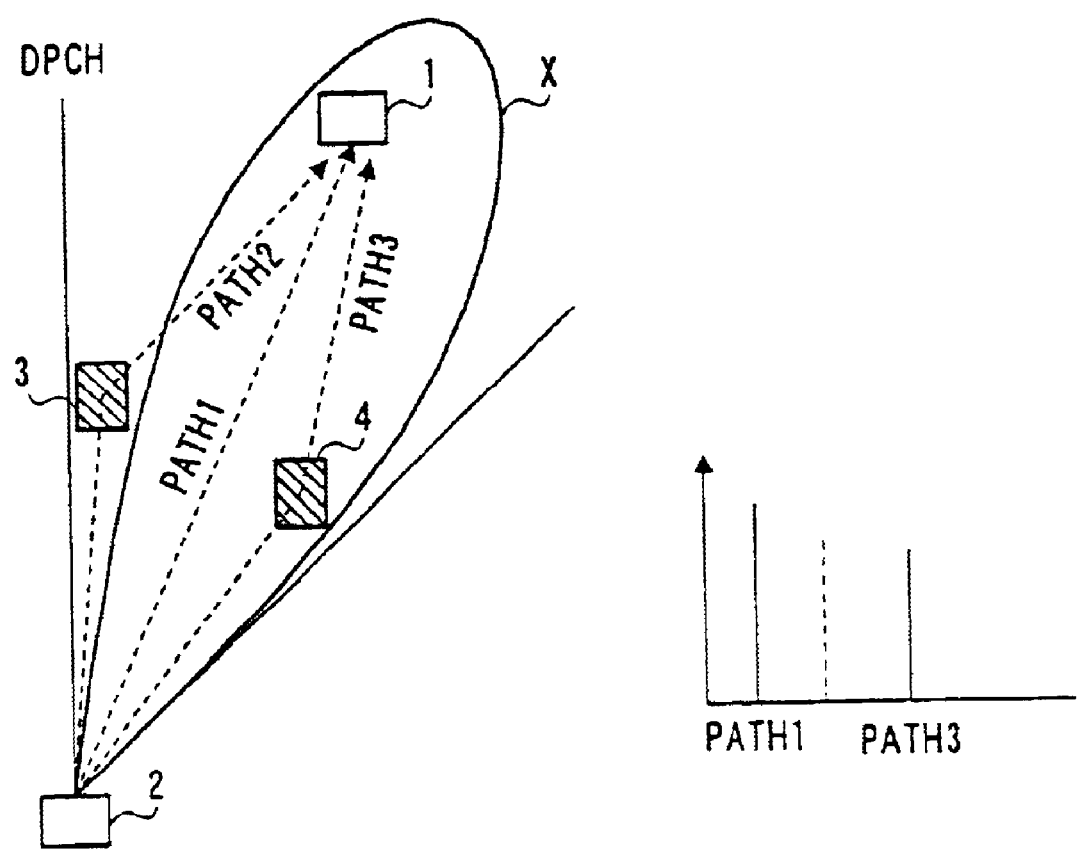
FIG. 2A is a diagram to explain transmission under directional control.
FIG. 2B is a diagram illustrating a delay profile in the case illustrated in FIG. 2A.
Figure 3:
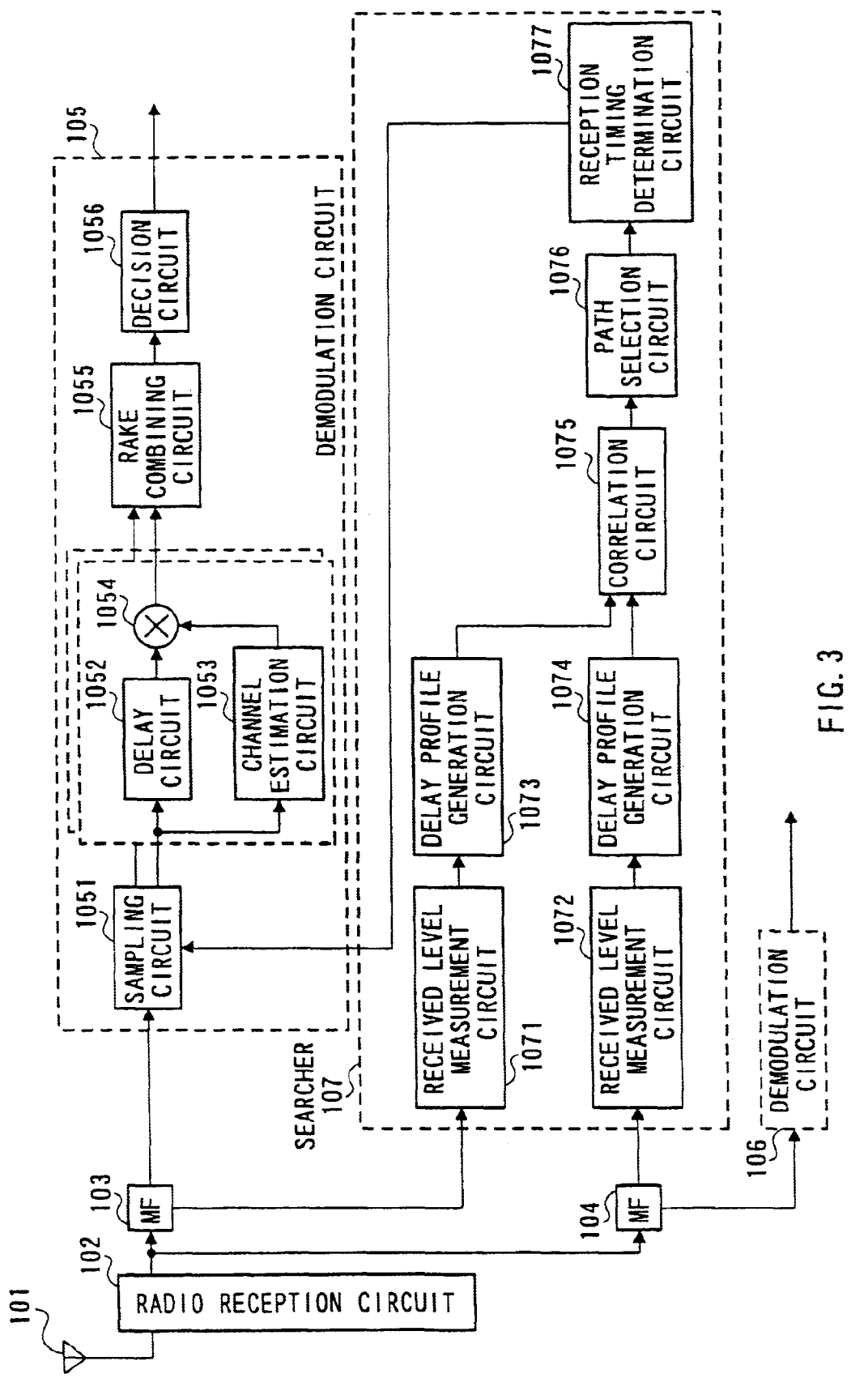
FIG. 3 is a block diagram illustrating a configuration of a communication terminal apparatus according to a first embodiment of the present invention.

FIG. 3 is a block diagram illustrating a configuration of a communication terminal apparatus according to the first embodiment of the present invention. Herein it is assumed that dedicated physical channel (DPCH: traffic channel) signals are controlled with a transmission radiation pattern in a forward channel from a base station to a communication terminal. In addition only a reception side is described in the communication terminal apparatus illustrated in FIG. 3.

A directional controlled signal transmitted from the base station is received in radio reception circuit 102 through antenna 101. Radio reception circuit 102 performs amplification (gain control), downconverting, and A/D conversion on a received signal. A/D converted data is despread in matched filters 103 and 104 with respective spreading codes used in spreading in the base station. Herein, data of the traffic channel (DPCH) is despread in matched filter 103, and data of a common control channel (CCPCH) is despread in matched filter 104.

Two kinds of despread data are respectively output to demodulation circuits 105 and 106. In other words, a traffic channel signal, despread in matched filter 103, is output to demodulation circuit 105 to be demodulated, and a common control channel signal, despread in matched filter 104, is output to demodulation circuit 106 to be demodulated.

In demodulation circuit 105, sampling circuit 1051 samples such a sample that a high correlation value is obtained in the despreading, in other words, a sample at a required timing. In addition, this timing is obtained in searcher 107 described later.

Channel estimation is performed on each sample in channel estimation circuit 1053 using a known reference signal (for example, pilot signal) contained in the signal. Based on the channel estimate, coherent detection is performed. In other words, with respect to samples delayed in delay circuit 1052, channel estimates are multiplied in multiplier 1054.

RAKE combining circuit 1055 performs RAKE combining on coherent-detected samples. Combined data is output to decision circuit 1056, which performs bit decision. Thus received data is obtained. In addition, common control channel signals, output to demodulation circuit 106, are demodulated with the same processing as described above to obtain received data.

Two kinds of data despread in matched filters 103 and 104 are respectively output to received level measurement circuits 1071 and 1072 in searcher 107. In other words, the traffic channel signal despread in matched filter 103 is output to received level measurement circuit 1071, and the common control channel signal despread in matched filter 104 is output to received level measurement circuit 1072.

Values measured in received level measurement circuits 1071 and 1072 are respectively output to delay profile generation circuits 1073 and 1074. In other words, a received level measured value of the traffic channel signal is output to delay profile generation circuit, and a received level measured value of the common control channel is output to delay profile generation circuit 1074.

Delay profile generation circuits 1073 and 1074 generate respective delay profiles by integrating for each reception timing. Obtained information is both output to correlation circuit 1075. Correlation circuit 1075 performs correlation calculation on the traffic channel signal and common control channel signal using the information on respective delay profiles.

A result of the correlation calculation is output to path selection circuit 1076 to perform a path selection (finger selection). A selection result is output to reception timing determination circuit 1077, where according to a path selection result, the reception timing is determined. The reception timing is output to sampling circuit 1051 in demodulation circuit 105 as the timing required for the above-mentioned sampling. The reception timing is further output to sampling circuit 1051 in demodulation circuit 106.

The following explains the operation of the path selection in the communication terminal apparatus with the above-mentioned configuration.

Data despread from the received signal is output to the received level measurement circuit in searcher 107. Received level measurement circuit 1071 receives the traffic channel signal despread in matched filter 103. Received level measurement circuit 1072 receives the common control channel signal despread in matched filter 104.

Received level measurement circuit 1071 performs received level (power) measurement using the input despread traffic channel signal. Received level measurement circuit 1072 performs received level (power) measurement using the input despread common control channel signal. The received level measurement is, for example, obtained from a square sum of a quadrature component and an in-phase component in quadrature modulated data. Further the level may be obtained by adding quadrature components or in-phase components over a predetermined interval on the same phase, and then obtaining the square sum.

Figure 4A:
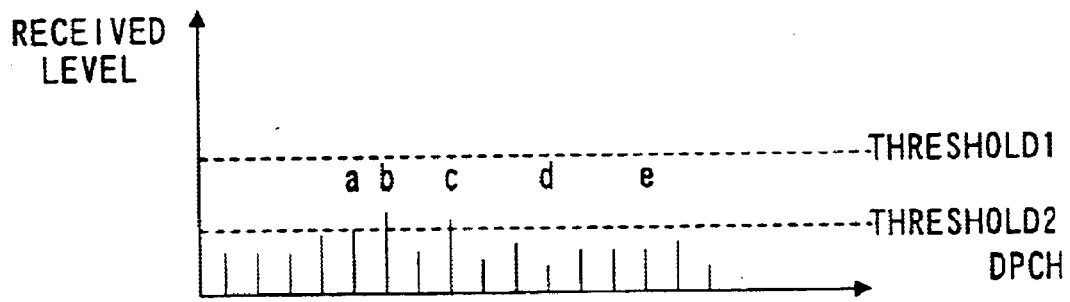
FIG. 4A is a diagram illustrating a delay profile to explain a radio reception method of the present invention.
Figure 4B:
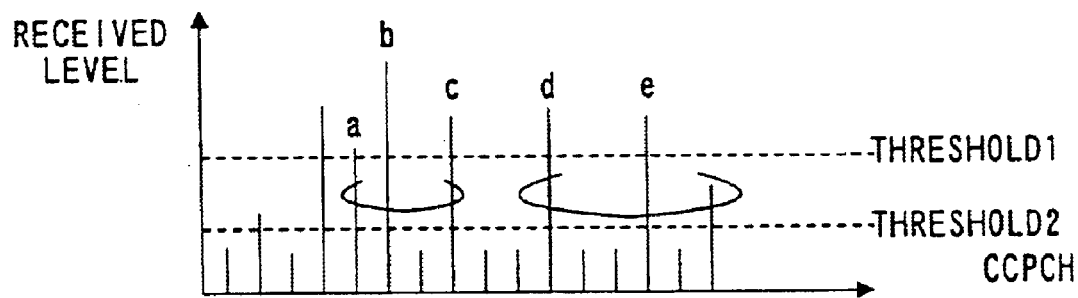
FIG. 4B is a diagram illustrating a delay profile to explain a radio reception method of the present invention.

Thus measured received levels are respectively output from received level measurement circuits 1071 and 1072 to delay profile generation circuits 1073 and 1074. Delay profile generation circuit 1073 generates a delay profile as illustrated in FIG. 4 using received levels of the traffic channel signals. Delay profile generation circuit 1074 generates a delay profile as illustrated in FIG. 4B using received levels of the common control channel signals. It is assumed herein that in a forward traffic channel, paths are limited to paths a, b and c by the directional control in the base station.

In the forward traffic channel, signals are generally transmitted from the base station with the transmit power control so that the communication terminal is capable of keeping a very limit received level providing the required quality of a RAKE combined signal, whereby the received level per a path is extremely low. For example, as illustrated in FIG. 4A, respective received levels of paths a, b and c are sometimes equal to or slightly higher than a threshold 2 to maintain the required quality (the threshold used not to select signals with levels lower than the threshold, which are considered as noises). The received levels of paths a, b and c are not different so much from received levels of paths d and e of which signals are considered as noises. Therefore when the path selection is performed using the delay profile of the traffic channel, the reliability becomes low.

On the other hand, in a forward common control channel, signals are transmitted from the base station so that the communication terminal is capable of receiving the signals with relatively high received levels. Therefore respective received levels of paths a, b and c are higher than a threshold 1 that is higher than the threshold 2. At this point, since the forward common control channel signals are not controlled with the transmission radiation pattern, paths d and e appear which provide received levels exceeding the threshold 1 besides paths a, b and c that are limited in the traffic channel. Accordingly when the path selection is performed using the delay profile of the common control channel, there is caused a possibility that a wrong path is selected.

These kinds of information indicative of respective delay profiles are output to correlation circuit 1075. Based on the respective delay profiles of the traffic channel and common control channel, correlation circuit 1075 performs the correlation calculation of averaged received levels for each reception timing, in other words, performs the correlation calculation between the delay profiles. As the correlation calculation, for each path, the received level in the traffic channel is multiplied by the received level in the common control channel.

Figure 4C:
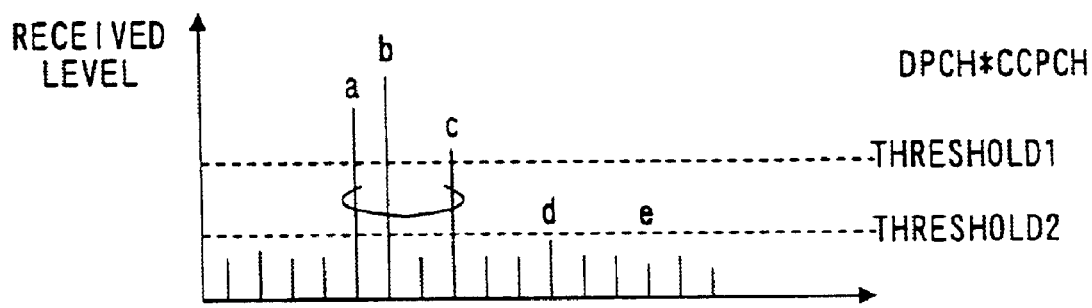
FIG. 4C is a diagram illustrating a delay profile to explain the radio reception method of the present invention.

When the correlation calculation is thus performed between the delay profiles of the traffic channel and common control channel, it is possible to reduce effects of the paths d and e having higher received levels other than the paths a, b and c limited in the traffic channel. That is, as illustrated in FIG. 4C, with respect to the paths a, b and c limited in the traffic channel, the respective received levels become high. Meanwhile with respect to the paths d and e which are not limited in the traffic channel, but have high received levels in the delay profile of the common control channel, the respective received levels become low.

Such a correlation calculation result is output to path selection circuit 1076, where the path selection is performed. At this point, the paths a, b and c limited in the traffic channel are selected. In addition, in the path selection, the number of paths to be selected is not particularly limited. For example, it may be possible to select all such paths that the correlation calculation result exceeds a predetermined threshold, or it may be possible to select a path with the highest correlation calculation result or a number of paths in descending order of correlation calculation result.

The path selection result indicative of the selected paths is output to reception timing determination circuit 1077, which determines respective timings for the paths a, b and c. Reception timing determination circuit 1077 outputs determined reception timings to sampling circuit 1051 in demodulation circuit 105 and a sampling circuit in demodulation circuit 106. Each sampling circuit performs demodulation according to input reception timings.

Thus, in the communication terminal apparatus according to this embodiment, the correlation calculation is performed between respective delay profiles of the traffic channel and common control channel, and thereby it is possible to reduce effects of paths with higher received levels other than paths limited in the traffic channel. As a result, even if the transmission directional control is applied to forward traffic channel signals, it is possible to perform the path selection accurately with high reliability.

(Second Embodiment)

This embodiment explains a case that preliminary selection is performed for paths on which the correlation calculation between the delay profiles is performed.

Figure 5:
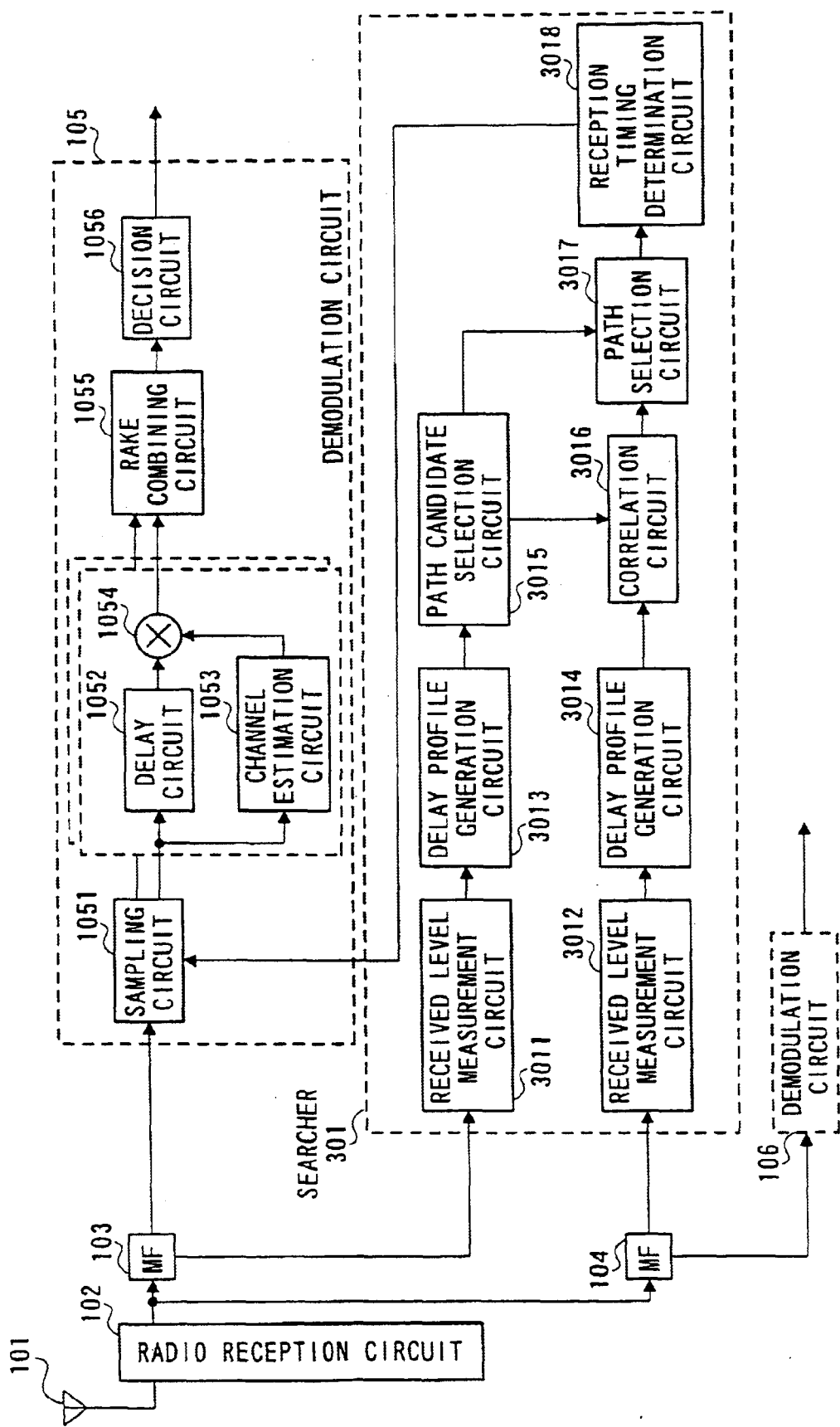
FIG. 5 is a block diagram illustrating a configuration of a communication terminal apparatus according to a second embodiment of the present invention.

FIG. 5 is a block diagram illustrating a configuration of a communication terminal apparatus according to the second embodiment of the present invention. In addition, in the communication terminal apparatus illustrated in FIG. 5, the same sections as in the communication terminal apparatus illustrated in FIG. 3 are given the same marks as in FIG. 3 to omit specific explanations thereof.

In the communication terminal apparatus according to this embodiment, searcher 301 has received level measurement circuits 3011 and 3012 that measure received levels of despread data, delay profile generation circuits 3013 and 3014 that generate respective delay profiles of the channels based on respective measured results of the received levels, path candidate selection circuit 3015 that selects path candidates from the delay profile of the traffic channel, correlation circuit 3016 that calculates the correlation between selected path candidates of the traffic channel and paths of the delay profile of the common control channel, path selection circuit 3017 that selects a path from the correlation calculation result, and reception timing determination circuit 3018 that determines a reception timing from the path selection result.

The following explains the operation of the path selection in the communication terminal apparatus with the above-mentioned configuration.

Data despread from the received signal is output to the received level measurement circuit in searcher 301. Received level measurement circuit 3011 receives the traffic channel signal despread in matched filter 103. Received level measurement circuit 3012 receives the common control channel signal despread in matched filter 104.

Received level measurement circuit 3011 performs received level measurement using the input despread traffic channel signal. Received level measurement circuit 3012 performs received level measurement using the input despread common control channel signal. The received level measurement is, for example, obtained from a square sum of a quadrature component and an in-phase component in quadrature modulated data.

The received level measured result of the traffic channel signal measured in received level measurement circuit 3011 is output to delay profile generation circuit 3013, where the delay profile of the traffic channel is generated. The received level measured result of the common control channel signal measured in received level measurement circuit 3012 is output to delay profile generation circuit 3014, where the delay profile of the common control channel is generated. In addition, with respect to the common control channel, it may be possible to generate a delay profile containing only signals of timings selected by the path selection described later, not to generate the delay profile containing the signals of all the timings.

The information on the delay profile of the traffic channel is output to path candidate selection circuit 3015, where path candidates are selected. In the path candidate selection (preliminary selection), for example, two thresholds are provided. A path with a received level equal to or less than a lower threshold is not selected as a candidate. Another path with a received level equal to or more than a higher threshold is selected unconditionally, and the information thereon is output to path selection circuit 3017.

Then the other path with a received level less than the higher threshold and more than the lower threshold, in other words, a path of which the signal is difficult to discriminate from a noise (path with a received level higher than the threshold 2 and lower than the threshold 1 in FIG. 4) is selected as a path candidate. The path candidate selection result is output to correlation circuit 3016.

The information on the delay profile of the common control channel is output to correlation circuit 3016. Correlation circuit 3016 performs correlation calculation between the path in the delay profile of the common control channel and the path selected as the path candidate output from path candidate selection circuit 3015. As the correlation calculation, for example, for each path, the multiplication of the received level in the traffic channel by that in the common control channel is calculated.

In the case where the correlation calculation is thus performed between the path candidate in the traffic channel and the path in the delay profile of the common control channel, when the path candidate is the path limited in the traffic channel, the received level of such a path becomes high.

The result indicative of such a correlation calculation is output to path selection circuit 3017 in searcher 301, where the path selection is performed. At this point, the path selected based on the correlation calculation result and the path selected unconditionally in path candidate selection circuit 3015 are set as selected paths. In addition in the path selection, the number of paths to be selected is not limited in particular. For example, it may be possible to select all such paths that the correlation calculation result exceeds a predetermined threshold. Further it may be possible to add such an update algorithm on path selection that the path selected in this method is compared with a path conventionally selected (a path selected one update interval before), and only a certain number of paths (for example, only one path) are changed.

The path selection result indicative of the selected paths is output to reception timing determination circuit 3018, which determines respective timings for the selected paths. Reception timing determination circuit 3018 outputs the determined reception timings to sampling circuit 1051 in demodulation circuit 105 and the sampling circuit in demodulation circuit 106. Each sampling circuit performs demodulation processing according to the input reception timings.

Thus, in the communication terminal apparatus according to this embodiment, when the correlation calculation is performed between the preliminary selected path candidate of the traffic channel and the path of the delay profile of the common control channel, only the received level of the path limited in the traffic channel becomes high. Therefore even if the transmission directional control is applied to forward traffic channel signals, it is possible to perform the path selection accurately with high reliability. In this case, since the correlation calculation is not performed on all the paths of the traffic channel, it is possible to reduce the calculation amount, and to perform the path selection promptly. Further it is thereby possible to reduce a processing load on the apparatus. Furthermore, with respect to the delay profile of the common control channel, it is possible to reduce the calculation amount by generating the delay path profile containing only the paths preliminary selected in the traffic channel.

(Third Embodiment)

In the second embodiment, it is assumed that a channel on which the path candidate selection is performed is the traffic channel. However, there is considered a condition that the traffic channel is not appropriate as a channel on which the path candidate selection is performed. For example, in the case where a received signal in the traffic channel has a low SIR due to the transmit power control, or the received level per one path is extremely low due to a large number of multipaths, it is difficult to perform the preliminarily selection with high reliability. Therefore this embodiment explains a case that a channel on which the path preliminary selection is performed is switched.

Figure 6:
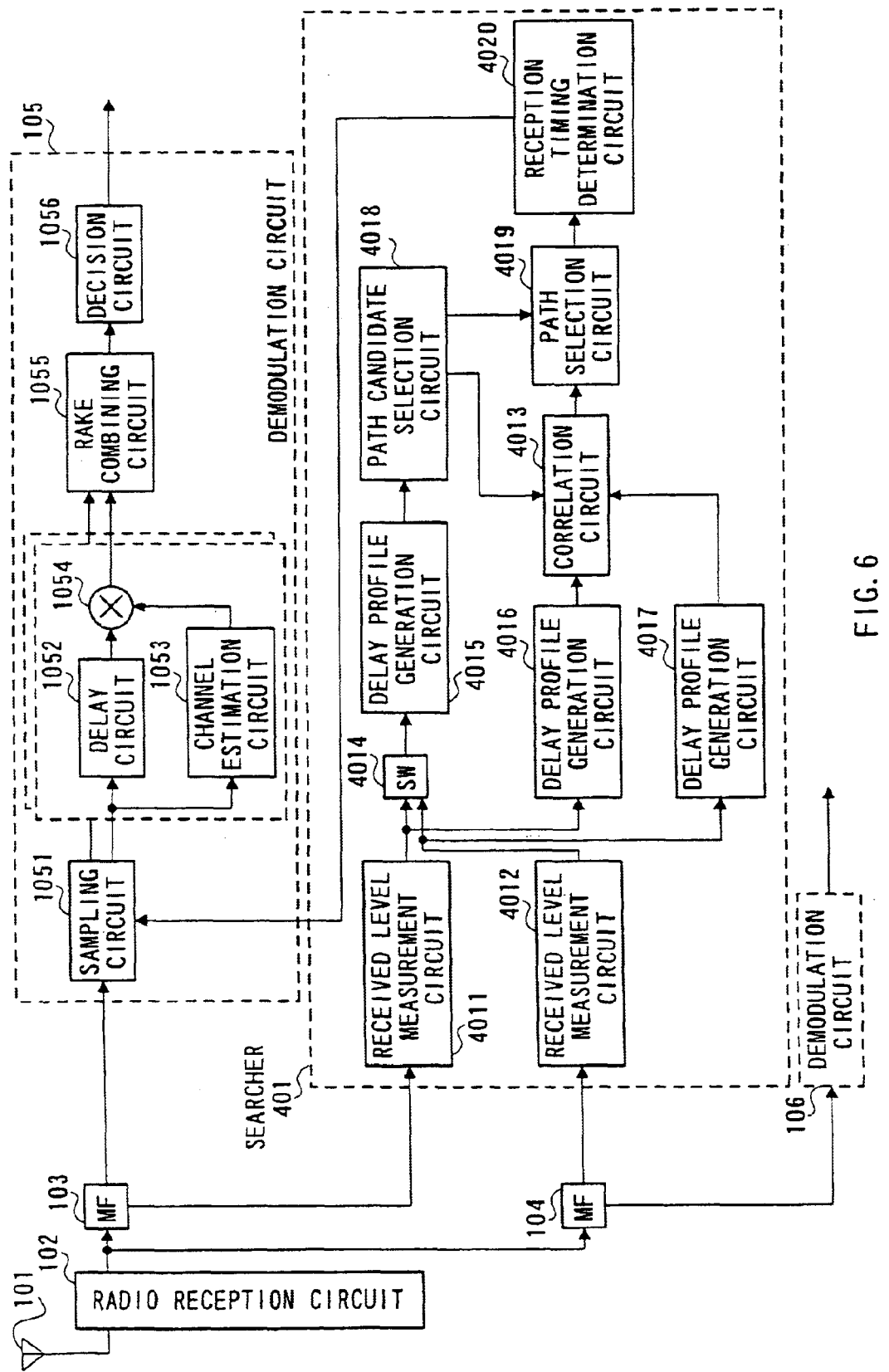
FIG. 6 is a block diagram illustrating a configuration of a communication terminal apparatus according to a third embodiment of the present invention.

FIG. 6 is a block diagram illustrating a configuration of a communication terminal apparatus according to the third embodiment of the present invention. In addition, in the communication terminal apparatus illustrated in FIG. 6, the same sections as in the communication terminal apparatus illustrated in FIG. 3 are given the same marks as in FIG. 3 to omit specific explanations thereof.

In the communication terminal apparatus according to this embodiment, searcher 401 has received level measurement circuits 4011 and 4012 that measure received levels of despread data, delay profile generation circuits 4015 to 4017 that generate delay profiles based on measured results of the received levels, path candidate selection circuit 4018 that selects path candidates from the received level measured results on each channel, correlation circuit 4013 that calculates the correlation between a path in a channel on which the path candidate selection is performed and a path of a delay profile of another channel, path selection circuit 4019 that selects a path from the correlation calculation result, reception timing determination circuit 4020 that determines a reception timing from the path selection result, and switch 4014 that switches a channel on which the path candidate selection is performed.

The following explains the operation of the path selection in the communication terminal apparatus with the above-mentioned configuration.

Data despread from the received signal is output to the received level measurement circuit in searcher 401. Received level measurement circuit 4011 receives the traffic channel signal despread in matched filter 103. Received level measurement circuit 4012 receives the common control channel signal despread in matched filter 104.

Received level measurement circuit 4011 performs received level measurement using the input despread traffic channel signal. Received level measurement circuit 4012 performs received level measurement using the input despread common control channel signal. The received level measurement is, for example, obtained from a square sum of a quadrature component and an in-phase component in quadrature modulated data.

When the path candidate selection is performed on the traffic channel, the received level of the traffic channel signal measured in received level measurement circuit 4011 is output to delay profile generation circuit 4015, where the delay profile is generated based on the received level. The information on the delay profile is output to path candidate selection circuit 4018 to select path candidates.

On the other hand, when the path candidate selection is performed on the common control channel, the received level of the common control channel signal measured in received level measurement circuit 4012 is output to delay profile generation circuit 4015, where the delay profile is generated based on the received level. The information on the delay profile is output to path candidate selection circuit 4018 to select path candidates. The path candidate selection is performed by switching a channel as appropriate with switch 4014. When the path candidate selection is performed on either channel, it is possible to set the channel as appropriate based on, for example, received qualities of both channels such as SIR and the number of path candidates.

In addition, with respect to the channel on which the path candidate selection is performed, it may be possible to generate a delay profile containing only signals of timings selected by the path selection, not to generate the delay profile containing the signals of all the timings.

For example, received level measurement circuits 4011 and 4012 measure SIR, and switching of switch 4014 is controlled in such a way as to perform the path candidate selection on a channel with a lower SIR value. When the switching of switch 4014 is performed with the number of path candidates, the switching of switch 4014 is controlled in such a way as to perform the path candidate selection on a channel with the more number of path candidates in path candidate selection circuit 4018.

In addition the path candidate selection method is the same as in the second embodiment.

With respect to received levels in the channel on which the path candidate selection is not performed, those in the traffic channel are output to delay profile generation circuit 4016, where the delay profile is generated based on the received levels. Received levels in the common control channel are output to delay profile generation circuit 4017, where the delay profile is generated based on the received levels. The information on these delay profiles is output to correlation circuit 4013. Correlation circuit 4013 performs the correlation calculation between the path in the delay profile and the path selected by the path candidate selection output from path candidate selection circuit 4018. As the correlation calculation, for example, for each path, the multiplication of the received level in the traffic channel by that in the common control channel is calculated.

In the case where the correlation calculation is thus performed between the path candidate and the path in the delay profile, when the path candidate is the path limited in the traffic channel, the received level of such a path becomes high.

The result indicative of such a correlation calculation is output to path selection circuit 4019, where the path selection is performed. At this point, the path selected based on the correlation calculation result and the path selected unconditionally in path candidate selection circuit 4018 are set as selected paths. In addition in the path selection, the number of paths to be selected is not limited in particular. For example, it may be possible to select all such paths that the correlation calculation result exceeds a predetermined threshold. Further it may be possible to add such an update algorithm on path selection that the path selected in this method is compared with a path conventionally selected (a path selected one update interval before), and only a certain number of paths (for example, only one path) are changed.

The path selection result indicative of the selected paths is output to reception timing determination circuit 4020, which determines respective timings for the selected paths. Reception timing determination circuit 4020 outputs the determined reception timings to sampling circuit 1051 in demodulation circuit 105 and the sampling circuit in demodulation circuit 106. Each sampling circuit performs demodulation processing according to the input reception timings.

Thus, in the communication terminal apparatus according to this embodiment, when the correlation calculation is performed between the preliminary selected path candidate of the traffic channel and the path of the delay profile of the common control channel, only the received level of the path limited in the traffic channel. Therefore even if the transmission directional control is applied to forward traffic channel signals, it is possible to perform the path selection accurately with high reliability. In this case, it is possible to switch the channel on which the path candidate selection is performed, as appropriate corresponding to communication environment or others, enabling the path selection to be performed with higher reliability.

(Fourth Embodiment)

While the first to third embodiments describe the case that the correlation calculation is always performed, there is considered another case that a base station does not perform transmission directional control, for example, when communication is started, or synchronization acquisition is performed again due to synchronization shift. In this case, it is preferable to perform ordinary path selection. Therefore this embodiment describes a case of switching a searcher that performs the correlation calculation corresponding to the presence or absence of the transmission directional control and an ordinary searcher.

Figure 7:
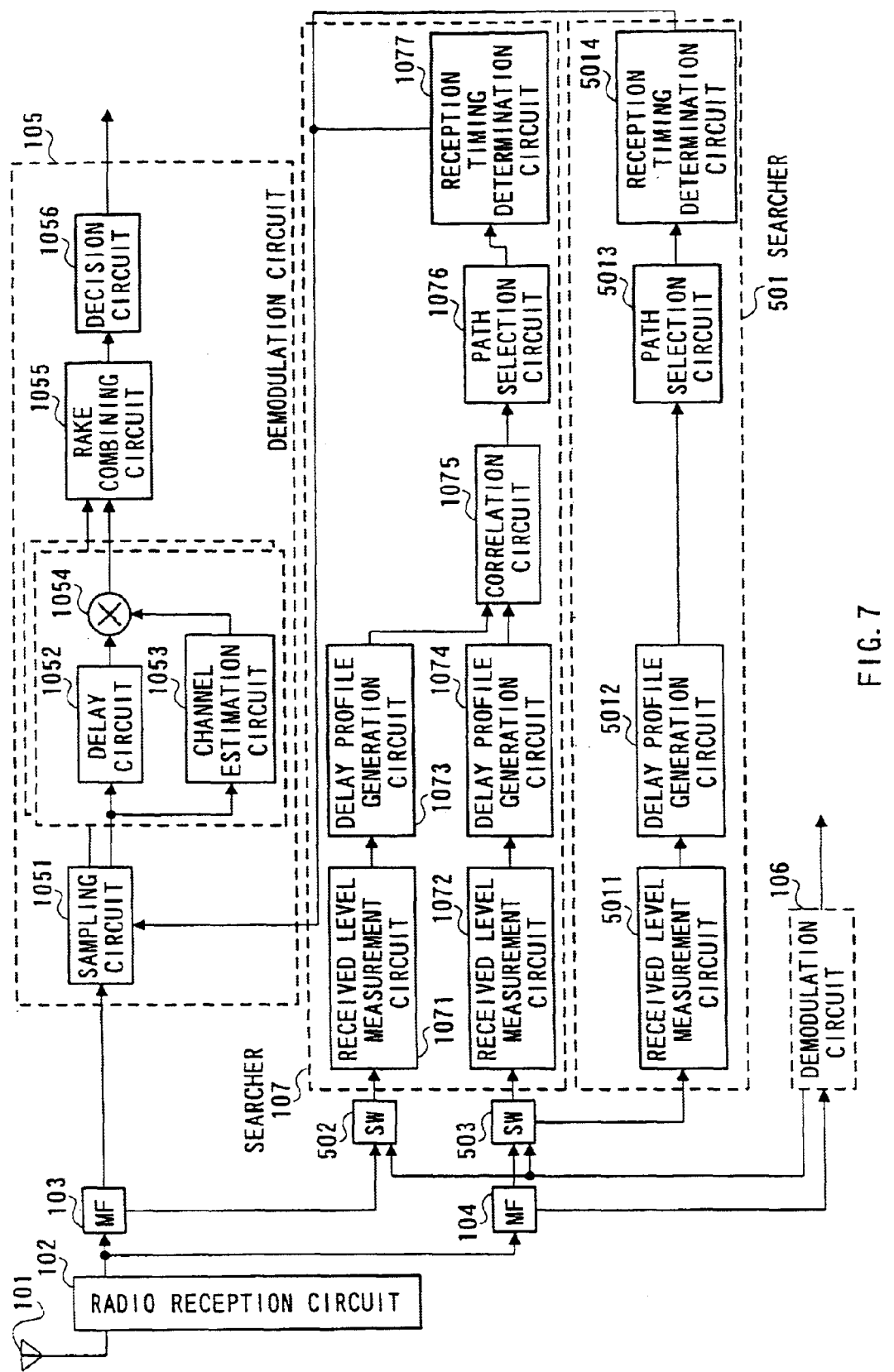
FIG. 7 is a block diagram illustrating a configuration of a communication terminal apparatus according to a fourth embodiment of the present invention.

FIG. 7 is a block diagram illustrating a configuration of a communication terminal apparatus according to the fourth embodiment of the present invention. In addition, in the communication-terminal apparatus illustrated in FIG. 7, the same sections as in the communication terminal apparatus illustrated in FIG. 3 are given the same marks as in FIG. 3 to omit specific explanations thereof.

The communication terminal apparatus according to this embodiment comprises searcher 107 that has received level measurement circuits 1071 and 1072 that measure received levels of despread data, delay profile generation circuits 1073 and 1074 that generate delay profiles based on the received levels, correlation circuit 1075 that calculates the correlation between paths of the delay profiles, path selection circuit 1076 that selects a path from the correlation calculation result, and reception timing determination circuit 1077 that determines a reception timing from the path selection result, and searcher 501 that has received level measurement circuit 5011 that measures a received level of despread data, delay profile generation circuits 5012 that generates a delay profile based on the received level, path selection circuit 5013 that selects a path from the delay profile, and reception timing determination circuit 5014 that determines a reception timing from the path selection result.

Further the communication terminal apparatus according to this embodiment has switch 502 that controls an input of the despread data of the traffic channel to searcher 107, and switch 503 that controls an input of the despread data of the common control channel to searcher 501.

The following explains the operation of the path selection in the communication terminal apparatus with the above-mentioned configuration.

When communication is started or synchronization acquisition is performed again due to synchronization shift, switch 503 is switched so that searcher 501 operates. Switch 502 is switched not to output the despread data to searcher 107.

Data despread from the received common control channel signal is output to received level measurement circuit 5011 in searcher 501. Received level measurement circuit 5011 performs received level measurement using the common control channel signal. This value measured in received level measurement circuit 5011 is output to delay profile generation circuit 5012. Delay profile generation circuit 5012 generates the delay profile of the common control channel based on the received level measured value.

The information on the delay profile is output to path selection circuit 5013, where the path selection is performed using the information on the delay profile.

The path selection result is output to reception timing determination circuit 5014, where the reception timing is determined using the path selection result. The determined reception timing is output to sampling circuits 1051 in demodulation circuits 105 and 106 to be used as a timing for demodulation processing.

On the other hand, when the base station performs the transmission directional control, switch 503 is switched so that searcher 107 operates. Further switch 502 is switched to output the despread data to searcher 107. The path selection operation in this case is the same as in the first embodiment. In addition information on "ON/OFF" of the transmission directional control is notified to communication terminals, for example, using control signals of the common control channel and traffic channel. FIG. 7 illustrates a configuration in which such information is broadcast using the common control channel, and using a signal indicative of the information, the switches are switched.

Thus the operations of the searchers are switched correspondingly to "ON/OFF" of the transmission directional control, whereby it is possible to perform correct path selection adaptively while following the control of the base station.

Figure 8:
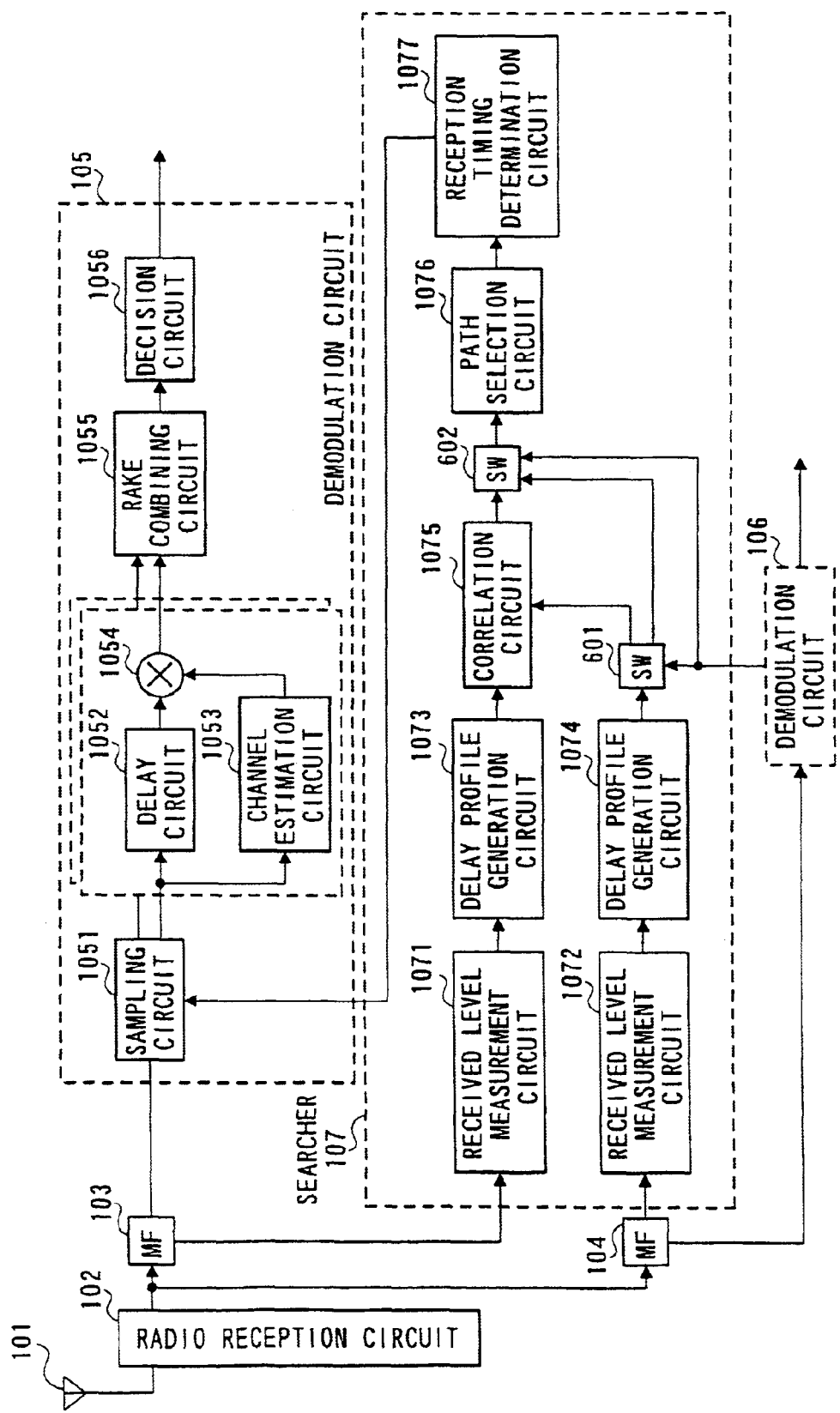
FIG. 8 is a block diagram illustrating another configuration of the communication terminal apparatus according to the fourth embodiment of the present invention.

Further while searchers 107 and 501 are both provided in the above-mentioned configuration, as illustrated in FIG. 8, provision of switches 601 and 602 enables delay profile generation circuit 1074 to be shared as delay profile generation circuits 1074 and 5012 in FIG. 7.

In the above-mentioned first to fourth embodiments, as illustrated in FIG. 9A, the common control channel (CCPCH) may be a channel in which a known reference signal (for example, pilot signal) 702 is intermittently inserted, for example, a perch channel, or as illustrated in FIG. 9B, may have a configuration in which a channel for the known reference signal, for example, pilot channel 703, and data channel 704 are code-multiplexed.

The present invention is not limited to the above-mentioned first to fourth embodiments, and it may be possible to perform various modifications to practice. For example, it may be possible to set to independently control respective time constants of respective delay profiles of the traffic channel and common control channel, for example, integration times in generating the delay profile or filtering coefficients in filtering with an IIR filter.

Further while the above-mentioned first to fourth embodiments describe the case of generating the delay profile using the common control channel (common physical channel for the purpose of common control), the present invention may be applicable to a case of generating the delay profile using the common physical channel since the common control channel is one aspect of the common physical channel.

Furthermore while the above-mentioned first to fourth embodiments describe the case of using, as the common control channel, CCPCH (Common Control Physical CHannel including Primary-CCPCH and Secondary-CCPCH in W-CDMA), the present invention may be applicable to a case of using, as the common control channel, CPICH (Common Pilot CHannel), and the CCPCH may include a plurality of physical channels.

Furthermore it may be possible to combine the above-mentioned first to fourth embodiments as appropriate to practice.

The communication terminal apparatus of the present invention adopts a configuration having a measurement section that measures respective received levels of respective despread signals of the common control channel and the transmission directional controlled dedicated physical channel at respective reception timings, a delay profile generation section that generates respective delay profiles based on respective measured results, a calculation section that performs correlation calculation between a received level in the dedicated physical channel and another received level in the common control channel, and a determination section that selects a path from a result of the correlation calculation to determine a reception timing of the path.

According to this configuration, in the case where forward transmission directional control is applied using, for example, a smart antenna and adaptive array antenna, since the communication terminal apparatus performs the correlation calculation between a delay profile of the dedicated physical channel and a delay profile of the common control channel, it is possible to perform path selection (finger selection) accurately with high reliability corresponding to the transmission directionality provided on the traffic channel.

The communication terminal apparatus of the present invention adopts a configuration having a measurement section that measures respective received levels of respective despread signals of the common control channel and the transmission directional controlled dedicated physical channel at respective reception timings, a delay profile generation section that generates respective delay profiles based on respective measured results, a preliminary selection section that selects a path candidate at a reception timing of one channel, a calculation section that performs correlation calculation between a received level in a selected path candidate and another received level in another channel, and a determination section that selects a path from a result of the correlation calculation to determine a reception timing of the path.

According to this configuration, since the path candidate at the reception timing of one channel is selected preliminarily, it is possible to decrease a calculation amount of received level measurement on another channel and a calculation amount of the correlation calculation between both channel signals, and therefore to reduce a processing load on the apparatus.

The communication terminal apparatus of the present invention adopts a configuration having a first searcher including a measurement section that measures respective received levels of respective despread signals of the common control channel and the transmission directional controlled dedicated physical channel at respective reception timings, a delay profile generation section that generates respective delay profiles based on respective measured results, a calculation section that performs correlation calculation between a received level in the dedicated physical channel and another received level in the common control channel, and a determination section that selects a path from a result of the correlation calculation to determine a reception timing of the path, a second searcher including a measurement section that measures a received level of a despread signal of the common control channel, a delay profile generation section that generates a delay profile based on a measured result, and a determination section that selects a path using the received level of the common control channel to determine a reception timing of the path, and a second switch that switches the first searcher and the second searcher corresponding to the presence or absence of the transmission directional control.

According to this configuration, it is possible to perform accurate path selection adaptively while following the control of a base station, by switching between operations of the searchers.

The communication terminal apparatus of the present invention adopts a configuration having a first searcher including a measurement section that measures respective received levels of respective despread signals of the common control channel and the transmission directional controlled dedicated physical channel at respective reception timings, a delay profile generation section that generates respective delay profiles based on respective measured results, a preliminary selection section that selects a path candidate at a reception timing of one channel, a calculation section that performs correlation calculation between a received level of a selected path candidate and another received level in another channel, and a determination section that selects a path from a result of the correlation calculation to determine a reception timing of the path, a second searcher including a measurement section that measures a received level of a despread signal of the common control channel, a delay profile generation section that generates a delay profile based on a measured result, and a determination section that selects a path using the received level of the common control channel to determine a reception timing of the path, and a second switch that switches the first searcher and the second searcher corresponding to the presence or absence of the transmission directional control.

According to this configuration, it is possible to perform accurate path selection adaptively while following the control of a base station, by switching between operations of the searchers. Further since the path candidate at the reception timing of one channel is selected preliminarily, it is possible to decrease a calculation amount of received level measurement on another channel and a calculation amount of the correlation calculation between both channel signals, and therefore to reduce a processing load on the apparatus.

Furthermore in the present invention, it is preferable to provide the apparatus with a first switch that switches a channel on which a path candidate is selected.

According to this constitution, since it is possible to switch a channel on which the path candidate selection is performed as appropriate corresponding to, for example, communication environment, it is possible to perform the path selection with higher reliability.

A radio reception method of the present invention has the measurement step of measuring respective received levels of respective despread signals of the common control channel and the transmission directional controlled dedicated physical channel at respective reception timings, the delay profile generation step of generating respective delay profiles based on respective measured results, the calculation step of performing correlation calculation between a received level in the dedicated physical channel and another received level in the common control channel, and the determination step of selecting a path from a result of the correlation calculation to determine a reception timing of the path.

According to this configuration, in the case where forward transmission directional control is applied using, for example, a smart antenna and adaptive array antenna, since the communication terminal apparatus performs the correlation calculation between a delay profile of the dedicated physical channel and a delay profile of the common control channel, it is possible to perform path selection (finger selection) accurately with high reliability corresponding to the transmission directionality provided on the dedicated physical channel.

The radio reception method of the present invention has the measurement step of measuring respective received levels of respective despread signals of the common control channel and the transmission controlled dedicated physical channel at respective reception timings, the delay profile generation step of generating respective delay profiles based on respective measured results, the preliminary selection step of selecting a path candidate at a reception timing of one channel, the calculation step of performing correlation calculation between a received level of a selected path candidate and another received level in another channel, and the determination step of selecting a path from a result of the correlation calculation to determine a reception timing of the path.

According to this configuration, since the path candidate at the reception timing of one channel is selected preliminarily, it is possible to decrease a calculation amount in the correlation calculation, and therefore to reduce a processing load on the apparatus.

As described above, in the communication terminal apparatus and radio reception method of the present invention, in the case where forward transmission directional control is applied using, for example, a smart antenna and adaptive array antenna, since the communication terminal apparatus performs the correlation calculation between a delay profile of the traffic channel and a delay profile of the common control channel, it is possible to perform path selection (finger selection) accurately with high reliability corresponding to the transmission directionality provided on the traffic channel.

The present invention is not limited to the above described embodiments, and various variations and modifications may be possible without departing from the scope of the present invention.

This application is based on the Japanese Patent Application No. HEI11-189093 filed on July 2, 1999, entire content of which is expressly incorporated by reference herein.

What is claimed is:

1. A communication terminal apparatus comprising:
   measurement means for measuring respective received levels of respective despread signals of a common control channel and a transmission directional controlled dedicated physical channel at respective reception timings;
   delay profile generation means for generating a delay profile based on measured results by said measurement means of the received level of the common control channel and a delay profile based on measured results by said measurement means of the transmission directional controlled dedicated physical channel;
   calculation means for performing correlation calculation between the delay profile in the transmission directional controlled dedicated physical channel and the delay profile in the common control channel; and
   determination means for selecting a path from a result of the correlation calculation to determine a reception timing of the path.

2. The communication terminal apparatus according to claim 1, further comprising:
   preliminary selection means for selecting a path candidate at a reception timing of one channel based on the delay profile in the transmission directional controlled dedicated physical channel,
   wherein the calculation means performs correlation calculation between a received level of a selected path candidate and the delay profile in the common control channel.

3. A communication terminal apparatus comprising:
   a first searcher having:
   measurement means for measuring respective received levels of respective despread signals of a common control channel and a transmission directional controlled dedicated physical channel at respective reception timings;
delay profile generation means for generating respective delay profiles based on respective measured results;
calculation means for performing correlation calculation between a received level in the transmission directional controlled dedicated physical channel and another received level in the common control channel; and
determination means for selecting a path from a result of the correlation calculation to determine a reception timing of the path;

a second searcher having:
measurement means for measuring a received level of a despread signal of the common control channel;
delay profile generation means for generating a delay profile based on a measured result; and
determination means for selecting a path using the received level of the common control channel to determine a reception timing of the path, a nd a switch that switches the first searcher and the second searcher corresponding to presence or absence of transmission directional control.

4. A communication terminal apparatus comprising:
a first searcher having:
measurement means for measuring respective received levels of respective despread signals of a common control channel and a transmission directional controlled dedicated physical channel at respective reception timings;
delay profile generation means for generating respective delay profiles based on respective measured results;
preliminary selection means for selecting a path candidate at a reception timing of one channel;
calculation means for performing correlation calculation between a received level of a selected path candidate and another received level in another channel; and
determination means for selecting a path from a result of the correlation calculation to determine a reception timing of the path;

a second searcher having:
measurement means for measuring a received level of a despread signal of the common control channel;
delay profile generation means for generating a delay profile based on a measured result; and
determination means for selecting a path using the received level of the common control channel to determine a reception timing of the path, and a switch that switches the first searcher and the second searcher corresponding to presence or absence of transmission directional control.

5. The communication terminal apparatus according to claim 2, further comprising:
a first searcher that switches a channel on which the path candidate is selected.

6. A radio reception method comprising:
(a) measuring respective received levels of respective despread signals of a common control channel and a transmission directional controlled dedicated physical channel at respective reception timings;
(b) generating a delay profile based on measured results in step (a) of the received level of the common control channel and a delay profile based on measured results in step (a) of the transmission directional controlled dedicated physical channel;
(c) performing correlation calculation between the delay profile in the transmission directional controlled dedicated physical channel and the delay profile in the common control channel; and
(d) selecting a path from a result of the correlation calculation to determine a reception timing of the path.

7. The radio reception method according to claim 6, further comprising:
selecting a path candidate at a reception timing of one channel based on the delay profile in the transmission directional controlled dedicated phvsical channel; and
performing correlation calculation between a received level of a selected path candidate and the delay profile in the common control channel.

* * * * *